July 31, 1951   D. D. MAYHEW   2,562,280
AUTOMATIC TRAILER BRAKE ACTUATOR
Filed Dec. 8, 1947   4 Sheets-Sheet 1
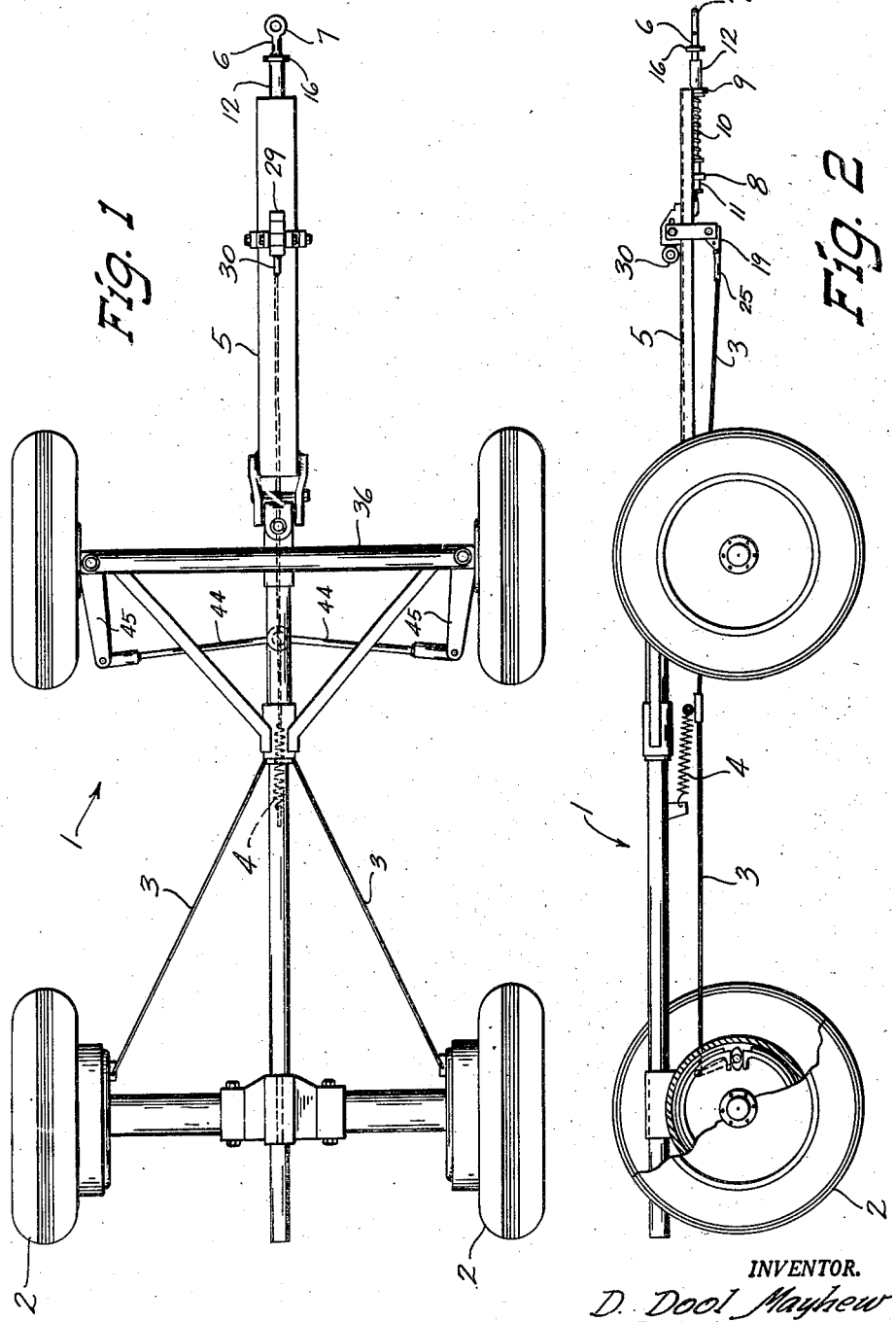
INVENTOR.
D. Dool Mayhew
BY
Attorney

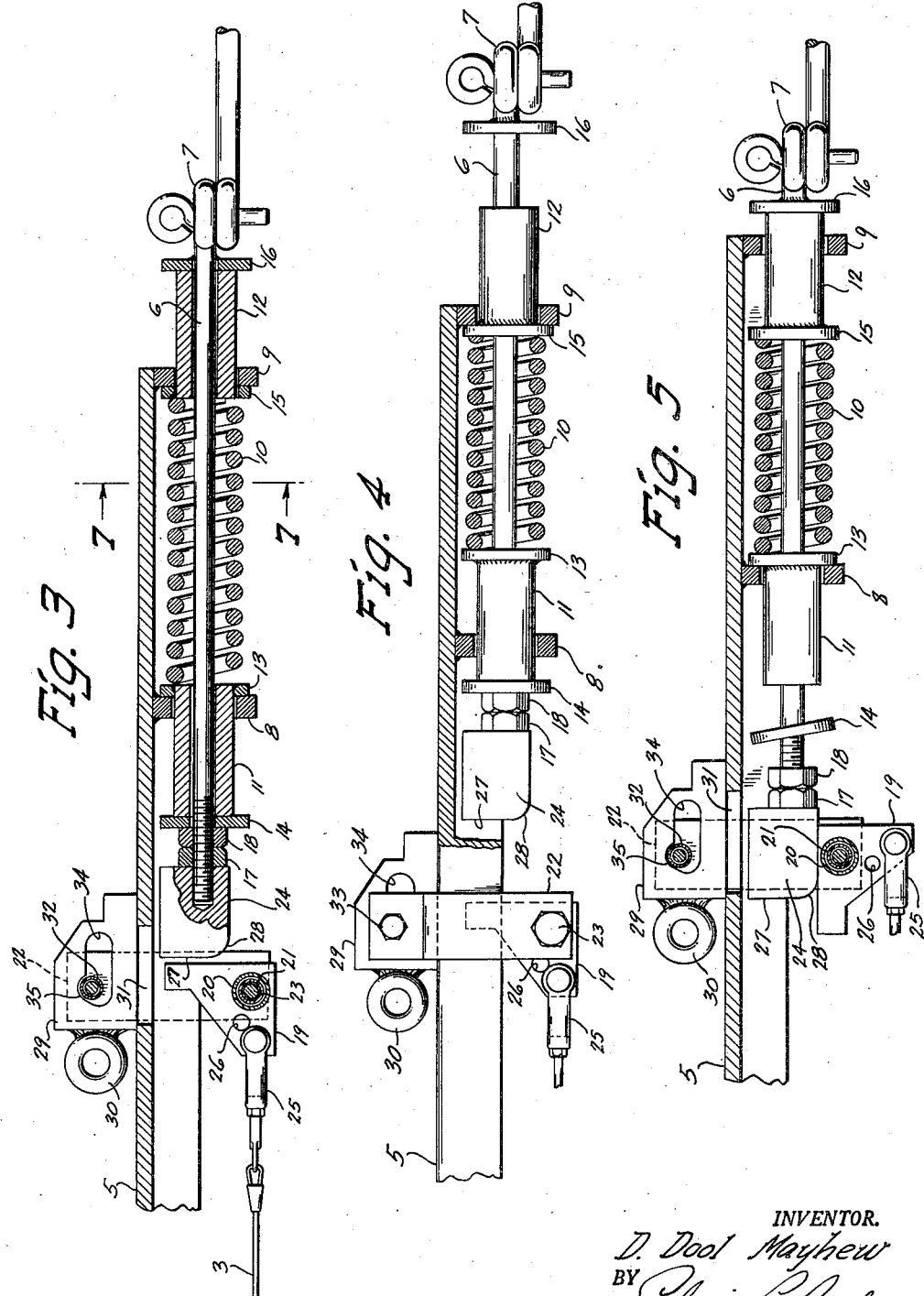

July 31, 1951   D. D. MAYHEW   2,562,280
AUTOMATIC TRAILER BRAKE ACTUATOR
Filed Dec. 8, 1947   4 Sheets-Sheet 3
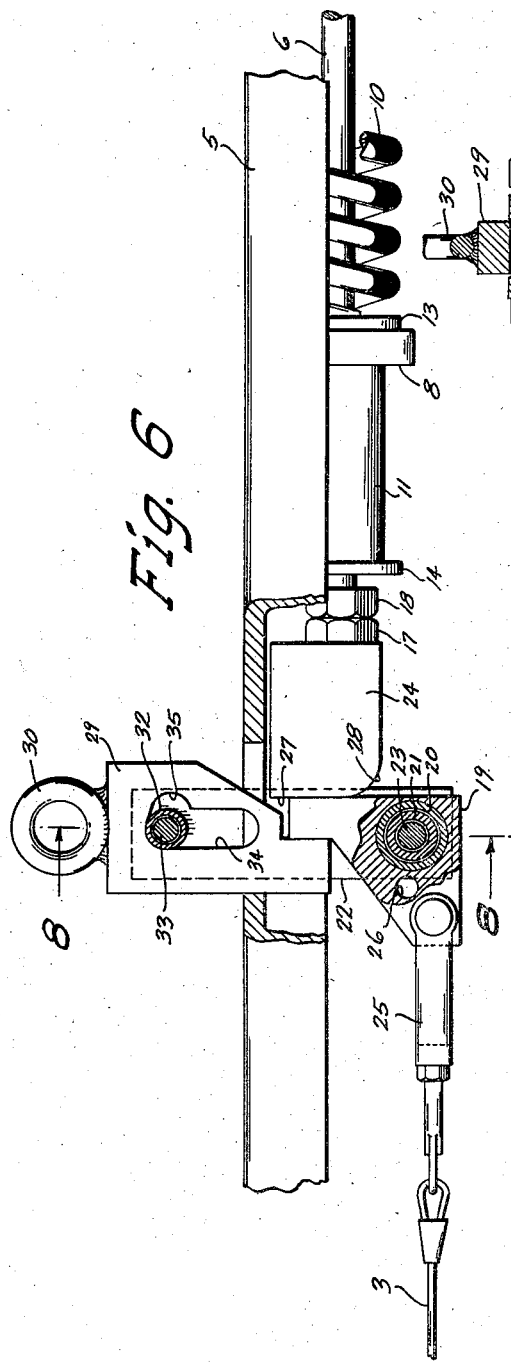
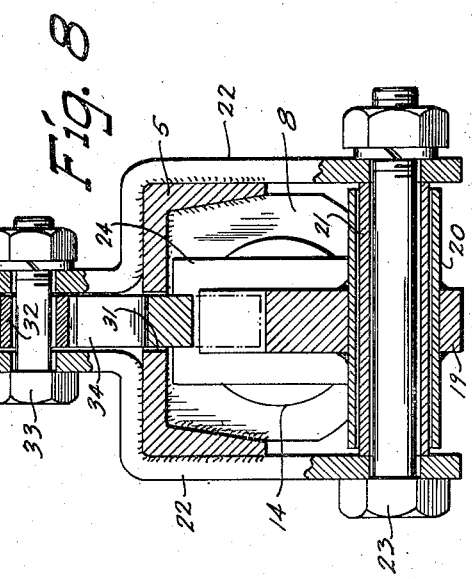
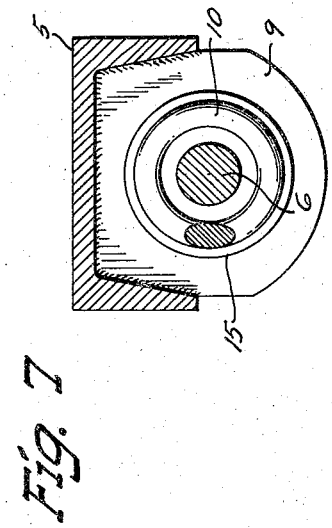
INVENTOR.
D. Dool Mayhew
BY
Attorney

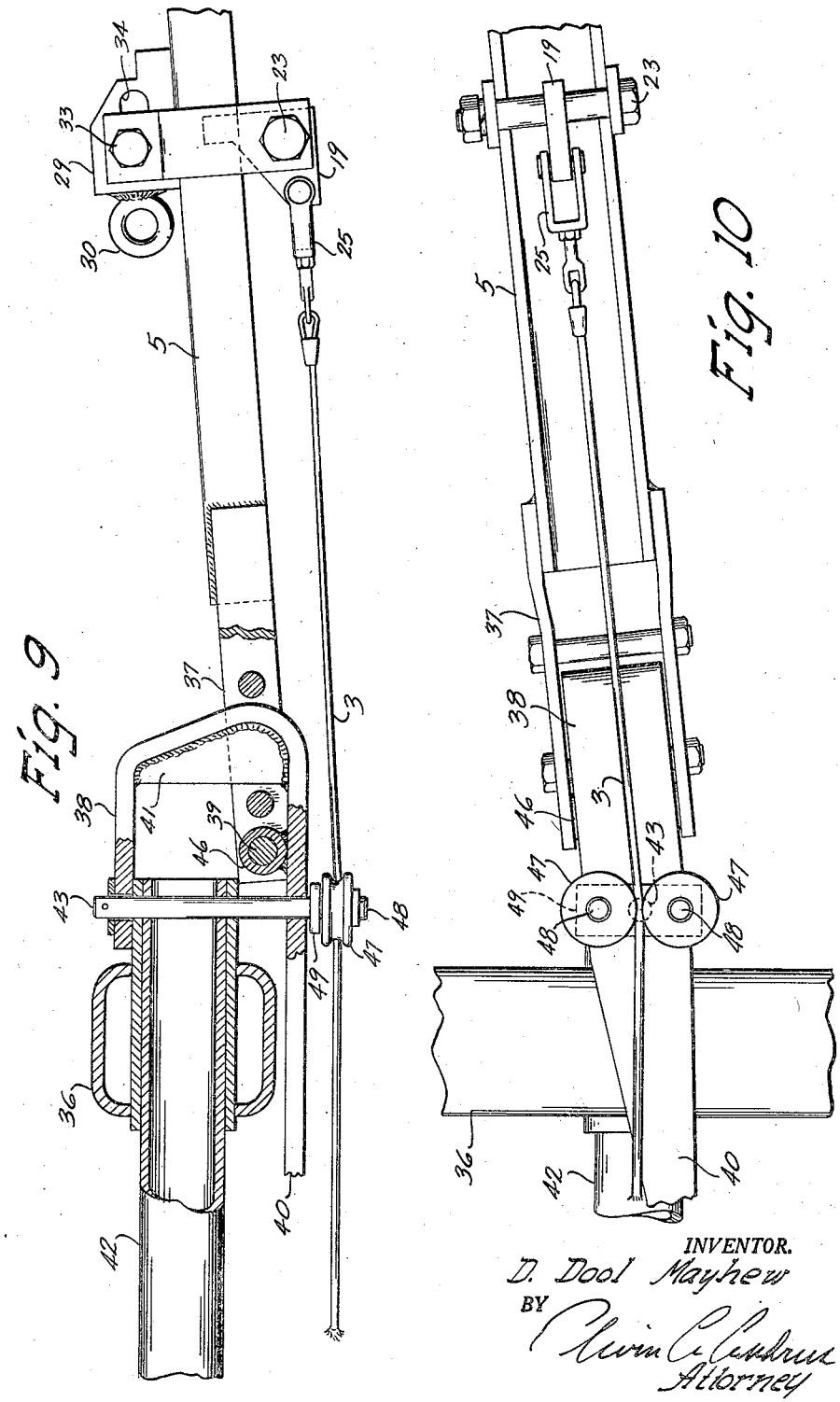

Patented July 31, 1951

2,562,280

UNITED STATES PATENT OFFICE 2,562,280

AUTOMATIC TRAILER BRAKE ACTUATOR

David Dool Mayhew, Rock Island, Ill., assignor to J. I. Case Company, Racine, Wis., a corporation of Wisconsin Application December 8, 1947, Serial No. 790,383

9 Claims. (Cl. 188—112)

This invention relates to an automatic trailer brake actuator, and has been applied to the construction of a brake actuator for tractor-pulled farm wagons and agricultural implements.

One of the objects of the invention is to provide a brake actuator which responds to a predetermined limited relative movement between the tractor and the trailer to effect actuation of the trailer brake when the trailer tends to move forwardly relative to the tractor and to release the brake when the tractor moves forward relative to the trailer.

Another object of the invention is to provide for selectively locking the brake actuator in inoperative position to prevent actuation of the brakes when it is desired to back the trailer by the tractor.

Another object is to provide a positive cushioned stop limit for the actuating movements required for operating and releasing the brake.

Another object is to provide for the adjustment of the power leverage and actuating movement for the brakes.

Another object is to provide a trailer hitch unit embodying automatic brake actuating mechanism and having shock absorber means protecting the tractor and the trailer against both sudden stopping and starting.

The invention is illustrated in the accompanying drawings in which:

Figure 1 is a top plan view of the running gear of a four-wheel trailer and the trailer hitch containing the brake actuator;

Fig. 2 is a side elevation of the running gear and hitch of Fig. 1;

Fig. 3 is a central longitudinal vertical section through the brake actuator mechanism showing the latter in the neutral position;

Fig. 4 is a section of the lever mechanism similar to Fig. 3 showing the shock absorbing action of the spring as the tractor draws the trailer;

Fig. 5 is a section of the lever mechanism similar to Fig. 3 showing the mechanism in brake actuating position as the trailer over-runs the tractor;

Fig. 6 is an enlarged sectional view similar to a part of Fig. 3 showing the mechanism locked against actuation, in the position of Fig. 3;

Fig. 7 is an enlarged transverse vertical section through the spring housing taken on line 7—7 of Fig. 3;

Fig. 8 is an enlarged transverse vertical section through the pivotal mounting for the lever;

Fig. 9 is a central longitudinal vertical section through the pivotal connections for the tongue showing the cable guide pulleys; and Fig. 10 is a bottom view of the wagon tongue showing the guide pulleys and cable.

The brake actuator may be applied to a trailer having any number of wheels. It is shown as employed on the hitch for a four-wheel wagon or trailer 1 wherein the brakes on the rear wheels 2 are actuated by the forward movement of a brake cable 3 which extends forwardly from wheels 2 to the actuator on the hitch. A suitable spring 4 biases the cable 3 rearwardly to release the brakes.

The brake actuator functions in response to the shifting of forces on the hitch between a pull and a push so that when the trailer tends to push the tractor, as in going downhill, the actuator pulls on cable 3 and sets the brakes. At all other times, as when the trailer is at rest or is being pulled, the spring 4 holds the brakes in released position.

For this purpose, the hitch comprises a tongue 5 which is secured to the gear of trailer 1, and a tongue extension or drawbar bolt 6 which has an eye 7 at its forward end for securing the same to the tractor drawbar, not shown.

The tongue 5 and its extension 6 are secured to each other for relative longitudinal movement within stop limits. For this purpose the tongue 5 may be of channel shape facing downwardly and having a pair of spaced guide blocks 8 and 9 extending across the same and downwardly therefrom. The drawbar bolt 6 extends through the guide blocks 8 and 9 and is carried thereby for limited longitudinal reciprocation beneath tongue 5.

The relative longitudinal movement of tongue 5 and bolt 6 is spring cushioned to prevent undesirable hammering of the parts in action.

In the construction illustrated a single coil spring 10 is mounted on bolt 6 between two spool-shaped sleeves 11 and 12 to bias the sleeves longitudinally apart. Sleeve 11 extends through guide block 8 and is free to reciprocate therethrough within the limits of its end flange 13 and the disc plate 14 which alternatively abut against opposite sides of block 8. Likewise sleeve 12 extends through guide block 9 and is free to reciprocate therethrough within the limits of its end flange 15 and stop 16 which alternatively abut against opposite sides of block 9.

Both sleeves 11 and 12 are mounted for reciprocation on bolt 6 between overall stop limits. Sleeve 11 is stopped in its movement in one direction on bolt 6 by the adjustable nut 17, held in place by lock nut 18. Sleeve 12 is stopped in its movement in the opposite direction on bolt 6 by the stop 16 which constitutes a flange welded to bolt 6 and which has a larger diameter than that of sleeve 12 so as to simulate an end flange for the latter for engagement by block 9, as described.

When no push or pull is exerted on the wagon tongue the spring biases the two spools 11 and 12 in opposite directions and urges the flanges 13 and 15 of the respective spools against the respective guide blocks 8 and 9 as shown in Fig. 3. In operation, when trailer 1 tends to move forwardly faster than the tractor, as when traveling downhill or when the tractor reduces its speed, the tongue 5 and block 9 move forwardly on spool 12 while block 8 pressing against flange 13 of spool 11 moves the spool forwardly on bolt 6 compressing the spring 10. The compression of spring 10 in this instance is limited and is at a maximum when block 9 engages stop 16 on bolt 6.

Likewise, when trailer 1 tends to move forwardly slower than the tractor, as when starting or going uphill and under normal load conditions, the tongue 5 and block 8 move rearwardly on spool 11 and block 9 engaging flange 15 moves sleeve 12, whereupon spring 10 starts to compress in accordance with the forces involved, as shown in Fig. 4. The compression of spring 10 in this instance is limited and is at a maximum when block 8 engages disc plate 14 and the stop nut 17.

The actuation of brake cable 3 is effected by the described relative longitudinal movement between tongue 5 and bolt 6 to effect setting of the brakes when trailer 1 tends to move forwardly relative to the tractor and release of the brakes at all other times.

For this purpose, the construction illustrated shows a lever 19 secured centrally on a rock sleeve 20 which is loosely mounted on a tubular member 21 clamped between side yoke members 22 by means of a bolt 23 passing through member 21 and the members 22.

The members 22 constitute a bracket depending from tongue 5 and welded thereto at a position near the rear end of bolt 6 where the latter in its relative sliding movement passes therebetween and between the pivot rock sleeve 20 and tongue 5 to effect actuation of lever 19.

The lever 19 may be shaped like a bell crank with an upper arm having a forward vertical face in the path of a plunger 24 threaded on the end of bolt 6, and which is engaged by the plunger in its movement to rock the lever between a position of brake actuation and a position of brake release.

The cable 3 is secured to the rearward arm of lever 19 by a clevis 25 at any one of a plurality of selective holes 26 in the lever to obtain the desired movement for the cable and the desired power leverage, there being a series of holes 26 disposed at different radial distances from the pivotal axis or fulcrum of the lever 19 for this purpose.

The plunger 24 has a vertical face 27 corresponding to that on lever 19 and a rounded lower corner 28 thereon to provide for a progressive non-frictional engagement between the plunger and lever as the plunger moves rearwardly and rocks the lever. In this rocking movement of lever 19 the vertical forward face thereon tilts rearwardly to a horizontal position, as shown in Fig. 6.

Rocking of lever 19 by rearward movement of plunger 24 effects a downward and forward movement of clevis 25 pulling forwardly on cable 3.

When plunger 24 moves forwardly out of interference with lever 19, the spring 4 returns the cable 3 and the lever 19 to brake release position.

In operation, the brakes are actuated automatically whenever the trailer 1 and tractor tend to move relatively toward each other, and the brakes are released automatically whenever the trailer 1 and tractor tend to separate.

The spring 10 cushions relative movements between the trailer 1 and tractor and serves to prevent frequent operation of the brakes under minor oscillations of the trailer.

Where the trailer is to be pushed backwardly by the tractor it is desirable to lock the actuator against setting of the brakes. For this purpose the yoke members 22 extend upwardly from tongue 5 to pivotally support a manually operable lock member 29 therebetween.

The lock 29 has a ring 30 at one end for manual manipulation of the lock, and its other end is adapted to drop through a hole 31 in the tongue 5 and to be positioned to the rear of the upper arm of lever 19 and thereby stop rearward tilting of the arm when in locked position. The lock 29 bears against the edge of the hole 31 in tongue 5, and is held in locked position by its pivotal support.

The lock 29 is slotted centrally to receive the tubular pivot member 32 clamped between the upper ends of bracket members 22 by a bolt 33 passing through the member 32 and members 22. The member 32 serves to space members 22 and prevent binding of the lock 29.

The slot 34 in lock 29 extends longitudinally of the lock so that the latter may be raised out of hole 31 to release the lever 19 for actuation.

The lock 29 is adapted to be turned to horizontal position and to rest on the top of tongue 5 across hole 31 when in unlocked position.

The slot 34 has a recess 35 at one end to allow the lock 29 to drop down from pivot 32 and lie flat on tongue 5, and which serves to secure the lock 29 against accidental displacement and prevent its movement to locked position except when manually lifted and manipulated.

The lock 29 is shown cut away at one side to avoid engagement with plunger 24. If desired, the lock 29 may be shaped to engage the face 27 of plunger 24 either in addition to or instead of engaging the back side of the upper arm of lever 19.

The connections between the front axle 36 and tongue 5 by which the trailer is drawn is shown in Figs. 9 and 10. The tongue is bifurcated at one end 37 and extends on either side of a clevis 38 to which it is pivoted by means of a pivot pin 39 for free vertical movements.

The U-shaped clevis 38 is disposed with its curved end forwardly to fit within the bifurcated end 37 of tongue 5 and has a lower longer member 40 which extends rearwardly beneath the axle 36. A web 41 welded within the clevis 38 provides for reinforcement thereof.

One end of the wagon frame 42 extends through axle 36 forwardly thereof between the upper and lower members of the clevis 38 to support the same. A vertical pivot pin 43 extends through the clevis and frame to secure the clevis and tongue therewith to the frame and provide the same with horizontal pivotal movement as for steering of the trailer.

Drag links 44 connected to member 40 of the clevis 38 and to the steering arms 45 of the respective front wheels comprise the steering gear for the front wheels.

Pivot pin 39 providing vertical movement of tongue 5 passes through holes in the ends of the tongue 5 and through a sleeve 46 which is welded to the upper side of the lower member 40 within clevis 38. Sleeve 46 should be located as near to pivot pin 43 as possible. So that the cable 3 passing beneath the tongue 5 rearwardly of the trailer experiences a minimum of change in working length due to movements of the tongue, the cable 3 is passed as close to the two centers of pivotal movements of the tongue as is practicable.

For this purpose two pulleys 47 are mounted on short pins 48 extending downwardly from either end of a short strip 49 of metal which is welded near its center to the lower end of pin 43 and is removable therewith. The pulleys 47 rotate on pins 48 and are in substantial peripheral contact with each other so that the grooves 49 of the two pulleys provide a closed eye therebetween for the cable 3.

When the tongue 5 moves to the right or left as when turning, the cable 3 rides against one or the other pulley 47 in direct line with the axis of pivotal movement of the tongue. When tongue 5 moves upwardly or downwardly due to the relative positions of the tractor and trailer the cable rides against the upper or lower grooves of the pulleys. Changes in effective working length of the cable is thus substantially eliminated under all conditions of travel so that the brakes operate properly at all times.

The invention provides a simple sturdy construction for automatically actuating trailer brakes and may be employed with substantially any type of trailer.

Various embodiments of the invention may be employed within the scope of the accompanying claims.

I claim:

1. An automatic trailer brake actuator for preventing over-run of the tractor by the trailer, comprising a pair of adjacent relatively movable members secured respectively to the trailer and the tractor to move in accordance therewith in response to relative movement between the trailer and tractor resulting from alternate push and pull forces therebetween, a brake actuator for said trailer, means translating the relative movement of said members into a movement of said actuator whereby relative closing together of the trailer and tractor by push forces obtains a movement of said actuator in a direction to actuate the trailer brakes, and relative separation of the trailer and tractor by pulling forces obtains a movement of said actuator in a direction to release the trailer brake, said translating means including a lever adapted to pivot to a substantially dead center position when the brake is released by said actuator to avoid actuation of the brake by minor changes in the push forces involved in said translating means, stop means disposed to positively limit the relative movement of said members in each direction, and a single resilient compression member disposed to be compressed upon the approach of the corresponding stop means for either direction of movement to cushion said approach.

2. An automatic trailer brake actuator for preventing over-run of the tractor by the trailer, comprising a pair of adjacent relatively movable members secured respectively to the trailer and the tractor to move in accordance therewith in response to relative movement between the trailer and tractor resulting from alternate push and pull forces therebetween, a positive limit stop for the relative movement of said members in each direction, a single compression spring carried by one of said members and biasing said members apart to prevent slapping of the same under minor shifting of position for the trailer and tractor, and constituting a cushion approach to said stops in both directions of movement a brake actuating cable for said trailer, a cable operating lever carried by one of said members and actuated by the other upon relative movement of the members in one direction to translate the relative movement of said members into a pull movement of said cable, and resilient means to move said cable in the opposite direction to a normal brake release position with said lever near a dead center position, whereby relative closing together of the trailer and tractor by push forces effects movement of the cable in a direction to actuate the trailer brakes, and relative separation of the trailer and tractor by pulling forces effects movement of said cable in a direction to release the trailer brake.

3. An automatic trailer brake actuator for preventing over-run of the tractor by the trailer, comprising a pair of adjacent relatively movable hitch members secured respectively to the trailer and the tractor to move in accordance therewith in response to relative movement between the trailer and tractor resulting from alternate push and pull forces therebetween, stop means limiting the relative movement of said members in opposite directions to provide for transmittal of said push and pull forces thereby, a lever pivotally carried by one of said members and having an arm disposed to be actuated by the other member upon relative movement of said members in one direction, a brake for said trailer, a brake actuating cable connected to said brake and to said lever, means biasing said cable in a direction opposite to the direction of movement of the cable resulting from the actuation of said lever in said one direction, and manually operable means carried by said trailer hitch member and engageable with said lever to lock said members against relative movement of an order effecting movement of said lever in a brake actuating direction, said last named means being held by gravity in either operative or inoperative position requiring manual movement thereof from either position to the other.

4. In combination with a trailer to be drawn by a tractor, said trailer having a tongue for drawing and brakes for stopping the trailer, a spring mounted adjacent said tongue, abutments at either end of said spring mounted on said tongue, mechanical means interposed between said abutments and said spring at either end thereof and connected to said tractor to compress said spring against the first of said abutments when drawing the trailer and against the second of said abutments as said trailer tends to over-run the tractor, and cam means mounted on said tongue connected to said brakes and disposed to be engaged by said mechanical means when compressing said spring against said second abutment whereby said brakes will be actuated to stop the trailer as the same tends to over-run the tractor, said mechanical means being otherwise free of said cam means to provide for substantial movement thereof relative to said tongue within the limits of operation of said spring.

5. A combination shock absorber and brake actuator for trailers and the like adapted to operate respectively when the trailer hitch is subjected to sudden loads and when the trailer tends to over-run the tractor comprising brakes for said trailer, a tongue for drawing the trailer, brackets mounted on said tongue, a movable rod supported by said brackets and extending forwardly of said tongue for connection to said tractor, a spring mounted on said rod and disposed between said brackets, abutment means mounted on said rod for limiting the movement of said rod relative to said brackets, other abutment means interposed between said spring and said brackets and selectively movable with said rod to compress the spring against the other of the same abutment means and one of said brackets, a cam mounted on the rearwardly extending end of said rod, a lever mounted on said tongue to be engaged by said cam, a cable connecting said brakes and said lever, and spring means normally biasing said brakes and lever in released position, said cam engaging said lever to actuate said brakes when said rod is moved in one direction to compress the spring against one of said brackets as the trailer tends to overrun said tractor and being otherwise free from said lever to provide for substantial movement thereof relative to said tongue without moving said cable.

6. In a trailer hitch of the class described, a channel shaped tongue extending forwardly from the trailer and facing downwardly, a pair of longitudinally spaced guide blocks secured across said channel and having aligned central apertures therein, a draw bar disposed in said apertures for longitudinal movement relative to said channel tongue, a coil compression spring carried freely on said draw bar between said guide blocks, a pair of cylindrical sleeves carried freely on said draw bar, one at each end of said spring and extending through the aperture in the corresponding guide block, a flange on the inner end of each sleeve disposed to limit outward movement of the same by engagement with the corresponding guide block under the biasing of said spring against the inner end of the sleeve, a pair of abutment flanges secured fixedly upon said draw bar and spaced apart a distance substantially corresponding to the total distance from the outer end of one sleeve to the outer end of the other sleeve when the sleeves are freely biased outwardly by said spring to a position of engagement of both sleeve flanges with the corresponding guide blocks, each said abutment flange being adapted to move the corresponding sleeve inwardly to compress said spring upon a corresponding movement of the draw bar relative to the tongue and to separate from the sleeve upon a movement of the drawbar in the opposite direction after the sleeve has reached the limit of its outward movement, the length of said sleeves providing for stop engagement of the corresponding abutment flanges with the corresponding guide blocks to positively limit the movement of said draw bar in either direction relative to the tongue and upon compression of the spring to a maximum extent.

7. The construction of claim 6 in which the position of at least one of said abutment flanges on the draw bar is adjustable.

8. The combination with the construction of claim 6 of a brake for the trailer, brake actuating means including a lever carried by said tongue independently of said draw bar, and an arm of said lever being disposed normally out of contact with the inner end of said draw bar and in the path of movement thereof to be engaged thereby only upon approach of said draw bar to the extreme inward position relative to the tongue.

9. The combination with the construction of claim 6 of a brake for the trailer, brake actuating means including a lever carried by said tongue independently of said draw bar, an arm of said lever extending upwardly into the path of movement of the inner end of said draw bar and disposed to be engaged and actuated thereby only upon approach of said draw bar to the extreme inward position thereof relative to the tongue, the upper web of said channel tongue having an opening therethrough adjacent the upper free end of said lever arm, and a lock member mounted on said tongue and movable to a position where it extends downwardly through said opening behind said lever arm to lock the latter against movement by said draw bar.

D. DOOL MAYHEW.

REFERENCES CITED

The following references are of record in the file of this patent:

UNITED STATES PATENTS

| Number | Name | Date |
|---|---|---|
| 1,185,751 | Ziehler | June 6, 1916 |
| 1,296,022 | Townsend | Mar. 4, 1919 |
| 1,416,753 | Ray | May 23, 1922 |
| 1,499,152 | Chandler | June 24, 1924 |
| 1,845,816 | Savage | Feb. 16, 1932 |
| 1,983,474 | Lee | Dec. 4, 1934 |
| 2,145,406 | Schroter et al. | Jan. 31, 1939 |
| 2,235,340 | Stuart | Mar. 18, 1941 |
| 2,253,631 | Latta | Aug. 26, 1941 |
| 2,399,746 | Klans et al. | May 7, 1946 |